United States Patent
Bernard-Granger et al.

(10) Patent No.: US 8,329,605 B2
(45) Date of Patent: Dec. 11, 2012

(54) SINTERED PRODUCT WITH A CUBIC STRUCTURE

(75) Inventors: Guillaume Bernard-Granger, Mazan (FR); Nassira Benameur, Jonquieres (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 275 days.

(21) Appl. No.: 12/663,623

(22) PCT Filed: Jun. 13, 2008

(86) PCT No.: PCT/FR2008/051063
§ 371 (c)(1),
(2), (4) Date: Feb. 19, 2010

(87) PCT Pub. No.: WO2009/004230
PCT Pub. Date: Jan. 8, 2009

(65) Prior Publication Data
US 2010/0221530 A1    Sep. 2, 2010

(30) Foreign Application Priority Data
Jun. 15, 2007   (FR) ..................... 07 04307

(51) Int. Cl.
*C04B 35/48* (2006.01)
*C04B 35/49* (2006.01)
*C04B 35/04* (2006.01)
*C04B 35/50* (2006.01)
*C04B 35/51* (2006.01)

(52) U.S. Cl. ......... 501/103; 501/104; 501/120; 501/152

(58) Field of Classification Search .............. 501/103, 501/104, 152, 153, 118–120
See application file for complete search history.

(56) References Cited

U.S. PATENT DOCUMENTS

| 3,767,745 A | 10/1973 | Gazza et al. |
| 4,098,612 A | 7/1978 | Rhodes et al. |

(Continued)

FOREIGN PATENT DOCUMENTS

EP   0 153 983 A1   9/1985

(Continued)

OTHER PUBLICATIONS

Tsukuma et al., "Transparent $TiO_2$-$Y_2O_3$-$ZrO_2$ Ceramics," *Advances in Cermaics*, 1988, vol. 24, pp. 287-291.

(Continued)

*Primary Examiner* — Melvin C Mayes
*Assistant Examiner* — Noah Wiese
(74) *Attorney, Agent, or Firm* — Oliff & Berridge, PLC (57) ABSTRACT

The invention relates to a sintered product containing: in mass percent based on oxides, more than 99.5% of a material having a cubic crystallographic structure for more than 95% of the mass thereof, known as a material with a cubic structure, and having a refractive index of less than 2.75 in the wavelength range between 0.2 μm and 5 μm; and more than 50 ppma of dopants which must contain titanium oxide $TiO_2$ and at least one additional dopant selected from $ZrO_2$, CaO, and MgO, in which said at least one additional dopant is different from the oxide(s) forming the material with a cubic structure, but can be MgO when the material with a cubic structure is spinel $MgAl_2O_4$.

39 Claims, 1 Drawing Sheet

U.S. PATENT DOCUMENTS

| | | | |
|---|---|---|---|
| 4,115,134 | A | 9/1978 | Rhodes |
| 4,116,831 | A | 9/1978 | Keat |
| 4,758,541 | A | 7/1988 | Tsukuma |
| 5,001,093 | A | 3/1991 | Roy et al. |
| 5,004,712 | A | 4/1991 | Borglum |
| 5,152,940 | A | 10/1992 | Shibata et al. |
| 5,308,809 | A | 5/1994 | Baumard et al. |
| 5,508,242 | A * | 4/1996 | Baumard et al. ............ 501/152 |
| 6,284,691 | B1 * | 9/2001 | Bruce ........................ 501/103 |
| 2003/0183806 | A1 | 10/2003 | Lyons |
| 2004/0159984 | A1 | 8/2004 | Isomura et al. |
| 2005/0164867 | A1 * | 7/2005 | Krell et al. ................. 501/120 |
| 2007/0197368 | A1 * | 8/2007 | Tsukuma et al. ........... 501/103 |

FOREIGN PATENT DOCUMENTS

| | | |
|---|---|---|
| EP | 1 557 402 A2 | 7/2005 |
| FR | 2 886 289 A1 | 12/2006 |
| WO | WO 2004/007398 A1 | 1/2004 |

OTHER PUBLICATIONS

Written Opinion of the International Searching Authority issued in International Application No. PCT/FR2008/051063 on Jul. 22, 2009 (with English-language translation).

International Search Report issued in International Application No. PCT/FR2008/051063 on Jul. 22, 2009 (with English-language translation).

* cited by examiner

SINTERED PRODUCT WITH A CUBIC STRUCTURE

The present invention relates to a novel sintered product, in particular for fabricating temperature viewing windows, missile domes or transparent armor, and a method for fabricating such a product.

In these applications, the products must be the most transparent possible in the visible and/or infrared and/or high ultraviolet ranges.

Sapphire is known to have good transparency in the wavelengths of the high ultraviolet (0.2-0.4 µm), the visible (0.4-0.8 µm) and the near and middle infrared (0.8 to 5 µm). However, the transparency of sapphire is poor above 5 µm. Moreover, its cost is prohibitive.

Research laboratories have therefore sought to synthesize transparent products. Among these products, a distinction is conventionally made between molten and cast products and sintered products.

Unlike sintered products, molten and cast products usually comprise an intergranular vitreous phase connecting the crystallized grains. The problems raised by sintered products and by molten and cast products, and the technical solutions adopted to solve them, are therefore generally different. A composition developed to fabricate a molten and cast product is therefore basically unsuitable as such for fabricating a sintered product, and vice versa.

Among sintered products, products of alumina, pure or containing dopants, are known, for example from EP 1 053 983, WO 2004/007398 and FR 2886289. Their transparency in the visible for wavelengths lower than 0.6 µm and their transparency in the infrared for wavelengths higher than 5 µm are nevertheless limited.

Transparent products with a cubic structure are also known. In particular, magnesium aluminate, lithium aluminate, yttrium aluminate, magnesium oxide and zinc oxide are known from U.S. Pat. No. 3,767,745. No transparency value is given.

Products of spinal $MgAl_2O_4$ are also known, for example from U.S. Pat. No. 5,001,093 and from U.S. Pat. No. 5,152,940.

Furthermore, the possibility of obtaining products of cubic zirconia stabilized with yttrium oxide having high transparency thanks to the addition of titanium oxide alone, in proportions of 10 mol %, is described in "Transparent $TiO_2$—$Y_2O_3$—$ZrO_2$ ceramics"—Advances in Ceramics, vol 24, Science and Technology of Zirconia III, 1988, p 287-291. The transmittance, measured on 0.73 mm thick samples, is low and maximal for a grain size of 150 µm.

Products of pure yttrium oxide are also known, for example from U.S. Pat. No. 5,004,712 or from US 2004/0159984. Products of yttrium oxide doped with lanthanum oxide (U.S. Pat. No. 4,115,134), with alumina (U.S. Pat. No. 4,166,831, U.S. Pat. No. 4,098,612), or with titanium oxide (U.S. Pat. No. 5,308,809) are also known. The mean grain size of the products based on yttrium oxide is generally higher than 10 µm and often higher than 100 µm. Although these products have good transparency in the infrared, their transparency in the visible is sometimes low.

EP 1 557 402 further describes a transparent polycrystalline ceramic with a cubic structure, having a grain size between 60 nm and 10 µm. These products have an in-line transmittance (RIT) higher than 75% of the theoretical RIT of said products for a wavelength between 0.6 µm and 0.650 µm. No other information is available concerning the RIT values for other wavelength ranges, particularly for wavelengths between 0.2 and 0.6 µm.

A need therefore exists for an inexpensive product having good transparency, in particular in the visible and/or high ultraviolet ranges.

It is an object of the invention to satisfy this need.

According to the invention, this purpose is satisfied by means of a sintered product comprising:

in mass percent based on oxides, more than 99.5% of a material known as a material with a cubic structure, having a cubic crystallographic structure for more than 95% of the mass thereof, and having a refractive index of less than 2.75 in the wavelength range between 0.2 µm and 5 µm, and more than 50 ppma of dopants, which must contain titanium oxide $TiO_2$ and at least one additional dopant selected from $ZrO_2$, CaO and MgO, in which said at least one additional dopant is different from the oxide(s) forming the material with a cubic structure, but can be MgO when the material which has a cubic structure is spinel $MgAl_2O_4$.

The inventors have surprisingly discovered that the simultaneous addition of $TiO_2$ and a dopant selected from $ZrO_2$, CaO, MgO and mixtures thereof improves the transparency, particularly in the visible and high ultraviolet, while improving the mechanical strength properties, particularly the three-point bend strength. The products thus obtained are particularly suitable for applications in transparent armor and missile domes.

The material with a cubic structure is selected to have a refractive index lower than 2.75 in the wavelength range between 0.2 µm and 5 µm. This criterion serves to select the materials with a cubic structure having an in-line transmittance IT higher than 64%, a value considered as a lower limit for the target applications. The refractive indexes of the materials with a cubic structure are known or can be measured by routine experiments.

The material with a cubic structure may in particular be selected from spinel $MgAl_2O_4$, zirconia ($ZrO_2$), YAG ($Y_3Al_5O_{12}$). These materials have good mechanical properties and good transparency for the visible (0.4 to 0.8 µm) and infrared (0.8 to 5 µm) wavelengths, making them advantageously usable as transparent armor, temperature viewing windows and missile domes. YAG also has the advantage of good transparency for wavelengths higher than 5 µm, and particularly for a wavelength of 7 µm.

In a preferred embodiment, the material with a cubic structure is zirconia ($ZrO_2$), stabilized in cubic form by yttrium oxide. Preferably, the stabilized zirconia in cubic form contains at least 8 mol % of yttrium oxide ($Y_2O_3$), even more preferably about 10 mol % of yttrium oxide.

Preferably, the total content of dopants is lower than 500 ppma, preferably lower than 400 ppma, preferably even lower than 200 ppma. Advantageously, the risks of precipitation at the grain boundaries are thereby limited, such precipitation being liable to cause an interaction with the incident radiation and a reduction of the optical performance of the product.

Still preferably, the total content of dopants is nevertheless higher than 100 ppma so that the effect on transparency is more pronounced.

The dopant $TiO_2$ can be used in rutile or anatase form, particularly in rutile form.

The additional dopants $ZrO_2$, CaO, and MgO must be different from the oxide(s) of the material with a cubic structure, independently of the crystallographic structure of these oxides. In other words, if the cubic material is cubic zirconia, the additional dopant cannot be zirconia, even in monoclinic form for example. The only exception is MgO, which may be an additional dopant of spinel $MgAl_2O_4$.

The respective contents of the most advantageous dopants for obtaining a useful transparency in the application mentioned in the introduction are the following.

When the dopants used are $TiO_2$ and $ZrO_2$, the $TiO_2/ZrO_2$ atomic ratio is preferably between 5/95 and 95/5, preferably between 40/60 and 60/40, and even more preferably substantially equal to 1.

When zirconia is used as one of the additional dopants, it is preferably stabilized, even more preferably stabilized with yttrium oxide, even more preferably stabilized with at least 3 mol % of yttrium oxide ($Y_2O_3$). When the dopants used are $TiO_2$ and CaO, the $TiO_2$/CaO atomic ratio is preferably between 5/95 and 95/5, preferably between 45/55 and 55/45 or between 37/63 and 63/37, even more preferably substantially equal to 1 or 1.5.

When the dopants used are $TiO_2$ and MgO, the $TiO_2$/MgO atomic ratio is preferably between 5/95 and 95/5, preferably between 40/60 and 60/40, and even more preferably substantially equal to 1.

The $TiO_2$ content is preferably higher than 25 ppma, preferably higher than 50 ppma and/or lower than 300 ppma, preferably lower than 250 ppma, preferably lower than 200 ppma, preferably lower than 150 ppma, even more preferably lower than 100 ppma.

The complement to 100% of the composition of the product according to the invention preferably consists of impurities, that is species introduced necessarily and involuntarily in the initial charge with the powders of material with a cubic structure and dopants or precursors thereof, and also during the various steps of the method.

In the preferred embodiments, the product according to the invention has a density higher than 99.9%, preferably higher than 99.95% of the theoretical density of the mixture of the material with a cubic structure and the dopants. The transparency is thereby further improved.

Furthermore, the transparency of the product according to the invention may be further considerably improved by subjecting the product to a suitable annealing, in a manner known per se, to decrease the number of oxygen vacancies. The invention thus relates to a doped and sintered product with a cubic structure according to the invention having undergone such an annealing, regardless of the method used to fabricate the product according to the invention, and a method for fabricating a product according to the invention comprising an annealing step suitable for decreasing the number of oxygen vacancies. This annealing is preferably carried out under air atmosphere or under oxygen atmosphere, even more preferably under air atmosphere. In the context of the present invention, "oxygen atmosphere" means any atmosphere containing more than 99% by volume of oxygen. This is reflected on the product by a decrease in the quantity of oxygen vacancies and by a significant improvement of the in-line transmittance (IT, measured here on a 1.3 mm thick sample).

The product with a cubic structure according to the invention thus has, according to preferred features, an in-line transmittance (IT), for an incident radiation wavelength of 0.3 µm, higher than 65% of the theoretical in-line transmittance ($IT_{theoretical}$), preferably higher than 75% of the theoretical in-line transmittance, preferably higher than 85% of the theoretical in-line transmittance, even more preferably higher than 95% of the theoretical in-line transmittance and/or an in-line transmittance (IT) at 0.6 µm higher than 75% of the theoretical in-line transmittance, preferably higher than 85% of the theoretical in-line transmittance, preferably higher than 94% of the theoretical in-line transmittance, even more preferably higher than 96% of the theoretical in-line transmittance, and/or an in-line transmittance (IT) at 4 µm higher than 92% of the theoretical in-line transmittance, preferably higher than 95% of the theoretical in-line transmittance, preferably higher than 97% of the theoretical in-line transmittance, even more preferably higher than 99% of the theoretical in-line transmittance, the in-line transmittance values being measured on 1.3 mm thick samples and the theoretical in-line transmittance values ($IT_{theoretical}$) being values calculated for the material with a cubic structure constituting the product of the invention in pure and monocrystalline form.

In the case in which the product according to the invention is a product of doped spinel $MgAl_2O_4$, it may have:

an in-line transmittance (IT) at 0.3 µm, higher than 55.7%, preferably higher than 64.2%, preferably higher than 72.8%, even more preferably higher than 81.4% and/or an in-line transmittance (IT) at 0.6 µm, higher than 65.3%, preferably higher than 74%, preferably higher than 81.8%, even more preferably higher than 83.6% and/or an in-line transmittance (IT) at 4 µm, higher than 81.8%, preferably higher than 84.5%, preferably higher than 86.3%, even more preferably higher than 88% the in-line transmittance values (IT) being measured on 1.3 mm thick samples.

In the case in which the product according to the invention is a product of doped YAG ($Y_3Al_5O_{12}$), it may have:

an in-line transmittance (IT) at 0.3 µm, higher than 53.4%, preferably higher than 61.7%, preferably higher than 69.9%, even more preferably higher than 78.1% and/or an in-line transmittance (IT) at 0.6 µm, higher than 63.0%, preferably higher than 71.4%, preferably higher than 79.0%, even more preferably higher than 80.6% and/or an in-line transmittance (IT) at 4 µm, higher than 78.9%, preferably higher than 81.5%, preferably higher than 83.2%, even more preferably higher than 84.9% and/or an in-line transmittance (IT) at 7 µm, higher than 81.7%, preferably higher than 84.3%, preferably higher than 86.1%, even more preferably higher than 87.5%, the in-line transmittance values (IT) being measured on 1.3 mm thick samples.

The transparency range of a product according to the invention is advantageously in the wavelength range between the wavelengths for which absorption occurs through electron transitions (toward the low wavelengths, dictated by the value of the gap energy of the material constituting the product) and the wavelengths for which absorption occurs by lattice vibrations (phonons, toward the high wavelengths).

Conventionally, a sintered product is in the form of a juxtaposition of grains.

Preferably, the mean grain size of the product according to the invention is higher than 0.03 µm and/or lower than 5 µm, preferably lower than 2 µm, preferably lower than 1.5 µm, preferably even lower than 1 µm, still preferably lower than 0.8 µm. The mechanical properties are thereby further improved.

In a preferred embodiment, the microstructure of the product according to the invention has a surface density Fv of "large grains" lower than 4% per unit area, preferably lower than 2% per unit area, preferably even lower than 0.1% per unit area. Preferably, the product according to the invention does not comprise any grains having a size more than two times larger than the mean size of the other grains.

Advantageously, this feature confers outstanding mechanical performance on the product, particularly in bending.

In particular, the product according to the invention may have a mechanical strength in three-point bending, at ambient temperature, higher than 200 MPa, preferably higher than 300 MPa, preferably even higher than 400 MPa. The method used to measure this three-point bend strength is described in the rest of the description.

It may also have a Vickers hardness measured at 20° C. higher than 13 GPa, preferably higher than 15 GPa. The method used to measure this Vickers hardness is described in the rest of the description.

The invention also relates to a method for fabricating a sintered product, characterized in that an initial charge is prepared comprising a powder of a material with a cubic structure having a refractive index lower than 2.75 in the wavelength range between 0.2 µm and 5 µm and a powder of dopants or dopant precursors necessarily comprising titanium oxide $TiO_2$ or a titanium oxide precursor, and at least one additional dopant selected from $ZrO_2$, CaO, and MgO and the precursors of these additional dopants, in quantities allowing the sintered product to conform to the invention.

Preferably, the method comprises a step of shaping by casting a slurry obtained from said initial charge.

As shown in greater detail in the rest of the description, a sintered product according to the invention may advantageously be obtained by the implementation of the fabrication method according to the invention comprising a step of shaping by casting a slurry prepared from:
- a powder of material with a cubic structure having a median elementary particle size of between 0.02 and 0.5 µm, preferably between 0.02 and 0.25 µm, the elementary particles preferably forming aggregates having a preferred median size between 0.1 and 3 µm, preferably between 0.1 and 1 µm; and
- a powder of dopants necessarily comprising titanium oxide $TiO_2$ or a titanium oxide precursor on the one hand, and at least one additional dopant selected from $ZrO_2$, CaO, MgO and/or a precursor of these oxides on the other hand, the median elementary particle size of the dopant being lower than or equal to the median elementary particle size of the powder of material with a cubic structure, the contents of material with a cubic structure and of dopants/dopant precursor(s) in the slurry being determined so that the sintered product obtained conforms to the invention.

A particular fabrication method according to the invention comprises the following successive steps:
a) preparation of a slurry from
- a powder of material with a cubic structure having a median elementary particle size of between 0.02 and 0.5 µm, preferably between 0.02 and 0.25 µm, the elementary particles preferably forming aggregates having a preferred median size between 0.1 and 3 µm, preferably between 0.1 and 1 µm; and
- a powder of dopants necessarily comprising titanium oxide $TiO_2$ or a titanium oxide precursor on the one hand, and at least one additional dopant selected from $ZrO_2$, CaO, MgO and/or a precursor of these oxides on the other hand, the median elementary particle size of the dopant being lower than or equal to the median elementary particle size of the powder of material with a cubic structure,
b) casting of the slurry in a porous mold followed by drying and stripping in order to obtain a green part,
c) drying of the stripped green part,
d) binder removal at a temperature between 350 and 1000° C., or even lower than or equal to 800° C.,
e) sintering, generally at a temperature between 1280° C. and 1800° C. until a sintered product is obtained having a density at least equal to 92% of the theoretical density of the product obtained at the end of step f), and
f) hot isostatic pressing (HIP) generally at a temperature between 1180° C. and 1780° C. under a pressure equal to or higher than 5 MPa, preferably equal to or higher than 50 MPa, in order to obtain a product called "dense sintered product". The hot isostatic pressing is carried out a temperature lower than the sintering temperature. Preferably the temperature of the hot isostatic pressing is 20 to 100° C. lower, preferably 50 to 100° C. lower than the sintering temperature, still preferably during a holding period longer than 0.5 hour, and even more preferably, shorter than 15 hours, the contents of material with a cubic structure and of dopants/dopant precursor(s) in the slurry prepared in step a) being determined so that the sintered product obtained at the end of step f) conforms to the invention.

The inventors have discovered that to fabricate a product according to the invention, in particular according to a method of the invention, and preferably by casting a slurry, carrying out the hot isostatic pressing at a temperature lower than the sintering temperature decreases the surface density of the large grains Fv. Thanks to this additional feature, the microstructure of the product according to the invention may comprise less than 4% per unit area of large grains (Fv), and even comprise substantially no large grains. This produces a product with outstanding bend strength.

In an embodiment, the pressure in step f) is lower than or equal to 300 MPa.

As explained above, the dense sintered product obtained at the end of step f) preferably undergoes an additional annealing step g).

Preferably, this annealing is carried out in air, at a temperature between 900° C. and the temperature used for the HIP during step f) and during a period of between 0.5 and 24 hours, in order to decrease the number of oxygen vacancies of the product. Advantageously, the reduction of the number of oxygen vacancies of the product improves its transparency, particularly in the visible and high ultraviolet range (wavelength range between 0.2 and 0.4 µm).

The annealing could also be carried out in another oxygenated environment than air, particularly under oxygen. Annealing in air nevertheless has the advantage of great simplicity, high efficiency, and optimal hygiene and safety conditions.

In the preferred embodiment of the invention, the sintering is carried out in air, the hot isostatic pressing is carried out under inert atmosphere and the annealing is carried out in air.

As an alternative, the annealing is carried out during step f). The hot isostatic pressing is then preferably carried out under oxygen atmosphere. Although this second embodiment is not preferred for safety reasons, it has the advantage of simplifying the method, with the simultaneous annealing with densification by HIP.

Preferably, the inventive method comprises one or preferably more of the following optional features:
- prior to step a), the median size of the aggregates of the powder of material with a cubic structure is modified, for example during a grinding step, so that it is between 0.1 and 3 µm, and preferably between 0.1 and 1 µm;
- the mold is dried prior to the casting of the slurry;
- the temperature throughout step b) is between 20 and 25° C.;
- the pressure of the slurry in the mold is between 1 and 1.5 bar;

the humidity of the mold environment is kept between 45 and 55%, preferably between 48 and 52%, throughout step b), The invention also relates to the use of a product according to the invention or of a product fabricated or producible by a method according to the invention as a temperature viewing window, missile dome or transparent armor.

Other features and advantages of the invention will appear from a reading of the description that follows and the examination of FIG. 1 which shows curves of measurements of the in-line transmittance (IT, in percent, on the y-axis), of various products according to the wavelength of the incident radiation ("λ", in μm, on the x-axis).

Figure 1:
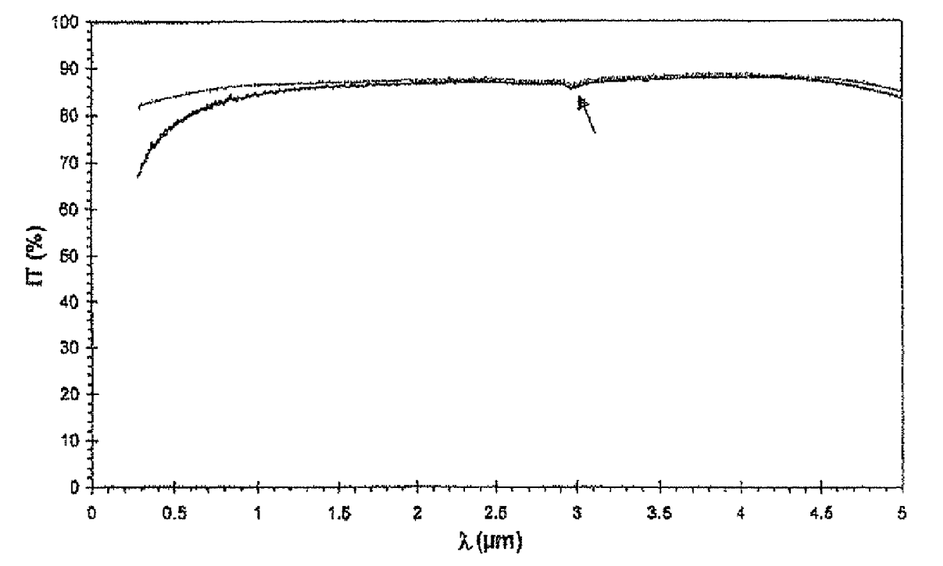

In this figure, the solid black curve represents the measurements obtained with a pure spinel product, having a mean grain size of 0.85 μm, the gray curve represents the measurements obtained with a spinel product doped with 75 ppma of titanium oxide ($TiO_2$) and 75 ppma of zirconia ($ZrO_2$), having a mean grain size of 0.75 μm (product of example 1).

In the context of the present invention, "material with a cubic structure" is a material having a cubic crystallographic structure for more than 95% of its mass, preferably for more than 97%, even more preferably for more than 99%, preferably for substantially 100% of its mass.

In the context of the present invention, "theoretical density" of a product consisting of a material with a cubic structure and dopants is the density of a mass consisting of this material with a cubic structure and these dopants and having zero porosity.

A "powder" is a set of particles which themselves may be aggregates of "elementary particles".

"Grains" are the crystal polyhedra constituting the finished product.

"Size" of a grain of a mass product is the diameter of the disk having an equivalent area to that of said grain in a cutting plane of said product.

"Size" of a particle of a powder is its mean dimension measured for example using a laser granulometer.

The mean size of a set of grains is the arithmetic mean of the sizes of these grains.

"Median particle size" of a mixture of particles, generally denoted $d_{50}$, is the size dividing the particles of this mixture into first and second populations of equal numbers, these first and second populations only comprising particles having a higher, or respectively lower, size than the median size.

"Dopant precursor" means a constituent adapted to provide a dopant during the fabrication of a sintered product according to the invention.

A "large grain" is a grain having a size higher than twice the mean size of the other grains.

"ppma" conventionally means "parts per million (million: $10^6$) atomic", "atomic" referring to the number of atoms of the element combined with oxygen.

All the in-line transmittance values are measured at an ambient temperature (20° C.) on samples having a thickness of 1.3 mm or, for the theoretical in-line transmittance values, calculated with a theoretical temperature of 20° C.

A method comprising steps a) to f) above is now described in greater detail.

In step a), a slurry is prepared.

"Slurry" means a substance formed by a suspension of particles in a liquid, generally water or an organic solvent (for example alcohol), with or without additives such as dispersants, deflocculants, polymers, etc. Preferably, the slurry comprises a temporary binding agent, that is removed from the product during the sintering.

The fabrication of a slurry is a technique perfectly known to a person skilled in the art. A person skilled in the art knows how to determine the contents of material with a cubic structure and dopants/dopant precursor(s) and the type and quantity of the additives in the slurry, in order to obtain a product according to the invention at the end of step f). In particular, the determination of the stability range of the slurry as a function of the pH thereof, by means of measurements of zeta potential, can be used, as well as measurements of rheological properties, particularly measurements of viscosity and flow threshold.

Typically, the chemical purity of the powder of material with a cubic structure used is higher than 99.97% by mass.

Before use, the size of the aggregates of the powder of material with a cubic structure is preferably adjusted to between 0.1 and 3 μm, preferably between 0.1 and 1 μm, for example by grinding.

Similarly, the mean grain size of the final product depends, in a manner known per se, on the sintering conditions, the temperature of the HIP treatment and the median size of the elementary particles of the powder of material with a cubic structure used in step a). For the mean size of these grains to be between 0.03 and 5 μm, the median size of the elementary particles of the powder material with a cubic structure used is selected between 0.02 and 0.5 μm. Preferably, the median size of the elementary particles of the powder used is selected so that the mean size of the grains of product with a cubic structure of the final product is higher than 0.03 μm, and lower than 5 μm, preferably lower than 2 μm, preferably lower than 1.5 μm, preferably lower than 1 μm, even more preferably lower than 0.8 μm.

Preferably, in step a), the dopants are added deliberately, that is systematically and methodically.

Preferably, the species of the slurry other than the dopants and the material with the cubic structure which may be found in the final product are impurities necessarily and involuntarily introduced with the powders of material with a cubic structure and dopants, and also during the various steps of the method. Their contents are considered to be insufficient to alter the advantageous properties of the product according to the invention.

The slurry can be prepared in a container using techniques known to a person skilled in the art by mixing and homogenization of the powders and the desired quantity of liquid.

Preferably, the slurry comprises more than 50% by weight of dry matter.

Even more preferably, the container containing the slurry can be temporarily placed under negative pressure, preferably more than 0.5 bar, to eliminate most of the residual air bubbles in the slurry.

Preferably, the mold is previously dried. Advantageously, the setting time during the drying step b) is reduced.

The temperature during the casting and preform formation operations is preferably maintained between 20 and 25° C.

The inventors have discovered that a casting of a slurry serves to confer on the product of the invention a density higher than 99.9%, even higher than 99.95% of the theoretical density after the complete fabrication cycle, and that this very high density improves the transparency.

After filling the mold, at least one porous wall of the mold at least partially absorbs the liquid of the slurry. The complete filling of the mold and the removal can be enhanced by pressurizing the interior of the mold, for example by using a feed column with a height adapted to the geometry of the part. Preferably, the pressure of the slurry in the mold is between 1 and 1.5 bar. Advantageously, the density of the green part is thereby increased and/or this makes it possible to form parts having a thickness higher than 3 millimeters.

Even more preferably, the humidity of the air surrounding the mold is maintained between 45 and 55%, preferably between 48 and 52%, throughout step b). Advantageously, the drying time is thus controlled.

As the liquid is removed, the particles of material with a cubic structure and dopants are immobilized with regard to one another. This immobilization is called "setting of the preform". The residual porosity between the immobilized particles nevertheless allows the passage of the liquid.

Additional slurry is preferably introduced into the mold as the liquid is absorbed. Advantageously, part of the volume left vacant by the liquid is thereby filled by particles of material with a cubic structure and dopants of the additional slurry.

After the moisture content of the part in the mold has dropped below 2%, it is considered that it has undergone sufficient drying to ensure its integrity and the maintenance of its geometry during its handling after stripping. The mold then contains a "preform" and any additional feed of slurry is stopped. The preform is then stripped to obtain a green part.

In step c), the green part undergoes a further drying, for example by storage in an oven at controlled temperature and humidity, according to conventional methods.

In step d), the dried green part undergoes a binder removal, preferably in air, at a temperature between 350 and 1000° C., or even lower than or equal to 800° C.

Preferably, the binder removal time lasts at least 0.5 hour and, also preferably, less than 15 hours. Binder removal is an operation known per se and adapted to remove the organic products from the green part.

A binder removal at more than 800° C. is particularly useful for removing binders and/or lubricants which decompose at high temperature.

In step e), the green part, dried and stripped of binder, or "blank", is sintered, that is densified and consolidated by a heat treatment.

Conventionally, the blank is placed in a medium, preferably air, of which the temperature varies as a function of time, according to a predefined cycle. The heat treatment comprises a phase of temperature rise of the medium surrounding the part, followed by a temperature holding phase or "sintering plateau" at a temperature generally between 1280 and 1800° C., and finally a temperature lowering phase. The sintering can be carried out in a conventional furnace or by Spark Plasma Sintering (SPS) or MWS (MicroWave Sintering).

In the particular case in which the material with a cubic structure is spinel $MgAl_2O_4$, the sintering temperature is preferably between 1400° C. and 1600° C. Preferably, to increase the density of the product obtained at the end of step f), the sintering in step e) is continued until a sintered product is obtained having a density at least equal to 96% of the theoretical density of the product obtained at the end of step f).

In the particular case in which the material with a cubic structure is zirconia ($ZrO_2$), the sintering temperature is preferably between 1280° C. and 1400° C. Preferably, to increase the density of the product obtained at the end of step f), the sintering in step e) is continued until a sintered product is obtained having a density at least equal to 94% of the theoretical density of the product obtained at the end of step f).

In the particular case in which the material with a cubic structure is YAG ($Y_3Al_5O_{12}$), the sintering temperature is preferably between 1400° C. and 1800° C. Preferably, to increase the density of the product obtained at the end of step f), the sintering in step e) is continued until a sintered product is obtained having a density at least equal to 92% of the theoretical density of the product obtained at the end of step f).

The duration of the sintering plateau is preferably between 0 (no plateau holding) and 20 hours. In a conventional furnace, the temperature rising/lowering rates are between 50 and 900° C./hour. For sintering SPS or MWS, they are between 20 and 300° C./minute.

The sintering could be carried out in a gaseous environment different from air, for example under oxygen. However, this modification of the sintering environment does not substantially alter the properties of the part obtained on completion of step f) of hot isostatic pressing.

The sintering causes a volumetric shrinkage, and hence a densification of the part. It is possible to obtain a post-sintering density equal to or higher than 92% of the theoretical density. This limit is considered by a person skilled in the art as necessary to obtain a density higher than 99.9% of the theoretical density after the next (HIP) step f).

In step f), the sintered part resulting from the sintering of the blank undergoes, after cooling, a pressurized post-heat treatment called "Hot Isostatic Pressing" (HIP), preferably under inert gas, for example under argon.

The hot isostatic pressing (HIP) is carried out in a chamber of which the temperature is generally between 1180 and 1780° C. under a pressure above 5 MPa, preferably about 50 MPa. The pressure may be lower than 1000 MPa, lower than 500 MPa, or even equal to or lower than 300 MPa. The temperature in the chamber is preferably lower than the sintering temperature. Preferably, the temperature in the chamber is 20° C. to 100° C. lower than the sintering temperature. Even more preferably, the temperature in the chambers is 50° C. to 100° C. lower than the sintering temperature.

The hot isostatic pressing (HIP) operation serves to further increase the density of the parts by eliminating the residual porosity possibly present after sintering, and closing certain structural defects such as microcracks, thereby improving the mechanical strength of the ceramic parts.

The binder removal and/or sintering can be carried out under a different atmosphere from air, for example under oxygen. The hot isostatic pressing can also be carried out in air or under another oxygenated atmosphere. However, for safety reasons, it is preferably carried out under inert atmosphere, preferably under argon.

On completion of step f), a sintered product according to the invention is obtained.

For optimal performance in applications of the product as a temperature viewing window, missile dome or transparent armor, the annealing step g) is particularly advantageous.

Electromagnetic radiation can be transmitted, reflected or scattered. Conventionally, a material is said to be "transparent" to a radiation when it is capable of transmitting this radiation in line, that is that it has a high in-line transmittance (IT). For a pure material, when in-line transmittance values measured are close to the theoretical in-line transmittance values calculated taking account in particular of the refractive index of the material, the scattering is negligible. The higher its in-line transmittance IT value, the more "transparent" a pure material will be.

In the following tests and examples, in order to evaluate the transparency, the parts are ground and polished to a mirror finish. After this preparation, the products have an average roughness (Ra)<10 nm and a thickness of 1.3 mm. The in-line transmittance IT is then measured with a spectrophotometer in the wavelength range between 0.2 and 7 μm on dry samples, that is previously oven-dried.

The theoretical in-line transmittance ($IT_{theoretical}$) of a material with a cubic structure as a function of the radiation wavelength is calculated indirectly using the OPTIMATR™ software from Echoscan Inc. (Niagara Falls, N.Y. 14303, USA) as follows:

The following parameters are entered into the software as inputs: the material with a cubic structure whereof the theoretical in-line transmittance is to be determined as a function of the radiation wavelength λ, the wavelength range for which the values of the theoretical in-line transmittance are required, the temperature concerned (20° C.). The software calculates the refractive index n (which is a function of λ) and the theoretical absorption coefficient Abs (also a function of λ). If Ep denotes the thickness of the material with a cubic structure considered, the theoretical in-line transmittance ($IT_{theoretical}$), expressed as a function of ?, is then given by the following formula:

$$ITtheoretical = \frac{2n}{1+n^2} e^{-Abs.Ep}$$

The mean grain size of the product of the invention was measured by the following method:

Various pictures of the product to be characterized are taken with a transmission electron microscope (TEM). The number of pictures obtained is adapted to observe about 150 grains. The number of grains observed is denoted by "n". Using an image processing software, such as UTHSCSA ImageTool for example, the area of each grain is calculated. The size of the grain "i" observed (i varying from 1 to n) is defined as the diameter $d_i$ of the disk having the same area as that of the grain. This operation is then repeated for each grain observed. The mean size G is the arithmetic mean of the sizes thus determined.

The following method was used to measure the surface density of the large grains Fv:

After having determined the size "$d_i$" of each grain observed and the mean grain size G of the product, all the large grains having a size larger than twice the mean size G can be identified. The total area AGG represented by the large grains is then calculated. The "surface density" of the large grains Fv is the ratio of the total area of the large grains AGG divided by the total area AT, multiplied by 100.

Abnormal growth is considered to occur when Fv is higher than 4%.

The mechanical strength of this sintered product of the invention was measured by three-point bending, at ambient temperature, on specimens measuring 24 mm*4 mm*2 mm, with a support span of 20 mm and a load gradient of 0.5 mm/min, using a Lloyd press, model LR150K.

The hardness was measured according to standard NF A 95-329 of May 1986, with the following specificities: application of a load of 5.3 kilograms for 60 seconds, using a Zwick microhardness meter, model 3212.

The density of the sintered products of the invention was measured following standard ISO 5017:1998, using the buoyancy.

The following nonlimiting examples are provided to illustrate the invention.

COMPARATIVE EXAMPLE 1

(Outside Invention): Spinel $MgAl_2O_4$ Product, Non-Doped

A slurry in the form of a suspension containing 55% by mass of dry matter was prepared by mixing the following in a polyethylene jar with stirring:

a spinel $MgAl_2O_4$ powder having a purity higher than 99.97% and a median aggregate size d50 of 0.2 μm, the aggregates consisting of elementary particles having a median size d50 of 0.05 μm, water and a dispersant.

The polyethylene jar contained balls of 99 vol % alumina. The mixing time was 24 hours.

The slurry thus prepared was deaerated and poured into a porous mold previously oven-dried for 24 h at 40° C. During the casting and holding in the mold, the temperature was maintained at 23° C., the ambient air being at atmospheric pressure and having a relative humidity of 50%.

After a first drying in the mold, followed by stripping, the green part was subjected to further drying and binder removal in air for 3 hours at 480° C.

The blank thus obtained was then sintered in air at 1530° C. for 3 hours. The sintered part was then subjected to hot isostatic pressing (HIP) in argon at 1480° C. for 15 hours and under a pressure of 200 MPa.

The sintered product obtained was then annealed in air at 900° C. for 3 hours.

The mean grain size of the product obtained was 0.85 μm.

EXAMPLE 1

Spinel $MgAl_2O_4$ Product Containing 75 ppma of $TiO_2$ and 75 ppma of $ZrO_2$ A slurry in the form of a suspension containing 52.5% by mass of dry matter was prepared by mixing the following in a polyethylene jar with stirring:

a spinel $MgAl_2O_4$ powder having a purity higher than 99.97% and a median aggregate size d50 of 0.2 μm, the aggregates consisting of elementary particles having a median size d50 of 0.05 μm, zirconium oxide ($ZrO_2$) powder stabilized with 3 mol % of yttrium oxide consisting of elementary particles having d50 equal to 0.05 μm, introduced in the amount of 75 ppm atomic (ppma), titanium oxide ($TiO_2$) powder in rutile form, consisting of elementary particles having d50 equal to 10 μm, introduced in the amount of 75 ppm atomic (ppma), and water and a dispersant.

The polyethylene jar contained balls of 99 vol % alumina. The mixing time was 24 hours.

The slurry thus prepared was deaerated and poured into a porous mold previously oven-dried for 24 h at 40° C. During the casting and holding in the mold, the temperature was maintained at 23° C., the ambient air being at atmospheric pressure and having a relative humidity of 50%.

After a first drying in the mold, followed by stripping, the green part was subjected to further drying and binder removal in air for 3 hours at 480° C.

The blank thus obtained was then sintered in air at 1530° C. for 3 hours. The sintered part, having a density higher than 96% of the theoretical density, was then subjected to hot isostatic pressing (HIP) in argon at 1480° C. for 15 hours and under a pressure of 200 MPa.

The sintered product obtained was then annealed in air at 900° C. for 3 hours in order to reduce the number of oxygen vacancies and to improve its transparency, particularly in the visible and high ultraviolet ranges.

The mean grain size of the product obtained was 0.75 μm.

COMPARATIVE EXAMPLE 2

(Outside the Invention): Product of Non-Doped YAG ($Y_3Al_5O_{12}$)

A slurry in the form of a suspension containing 70% by mass of dry matter was prepared by mixing the following in a polyethylene jar with stirring:
a YAG ($Y_3Al_5O_{12}$) powder having a chemical purity higher than 99.95% and having an aggregate size between 5 μm and 200 μm, the aggregates consisting of elementary particles having a median size d50 of 0.3 μm,
water and a dispersant.

The polyethylene jar contained balls of 99 vol % alumina. The mixing time was 24 hours.

The slurry thus prepared was deaerated and poured into a porous mold previously oven-dried for 24 h at 40° C. During the casting and holding in the mold, the temperature was maintained at 23° C., the ambient air being at atmospheric pressure and having a relative humidity of 50%.

After a first drying in the mold, followed by stripping, the green part was subjected to further drying and binder removal in air for 3 hours at 650° C.

The blank thus obtained was then sintered in air at 1600° C. for 2 hours. The sintered part was then subjected to hot isostatic pressing (HIP) in argon at 1550° C. for 15 hours and under a pressure of 200 MPa.

The sintered product obtained was then annealed in air at 900° C. for 3 hours.

The mean grain size of the product obtained was 0.9 μm.

EXAMPLE 2

YAG ($Y_3Al_5O_{12}$) Product Containing 75 ppma of $TiO_2$ and 75 ppma of CaO

A mixture of $CaCO_3$ and $TiO_2$ powder in rutile form was ground in a jar mill containing balls of 99 vol % alumina, for the time required to reach a mean elementary particle size lower than or equal to the mean size of the elementary particles of the YAG ($Y_3Al_5O_{12}$) powder also entering into the composition of the product.

A slurry in the form of a suspension containing 70% by mass of dry matter was prepared by mixing, in a jar mill, a dispersant, an organic binder, YAG ($Y_3Al_5O_{12}$) powder having a chemical purity higher than 99.95% and an aggregate size of between 5 μm and 200 μm, the aggregates consisting of elementary particles having a median size d50 of 0.3 μm, and the ground mixture of $CaCO_3+TiO_2$, introduced so that in the final product, the quantities of CaO and $TiO_2$ were each 75 ppm atomic, for a total dopant content of 150 ppm atomic.

The polyethylene jar contained balls of 99 vol % alumina. The mixing time was 24 hours.

The slurry thus prepared was deaerated and poured into a porous mold previously oven-dried for 24 h at 40° C. During the casting and holding in the mold, the temperature was maintained at 23° C., the ambient air being at atmospheric pressure and having a relative humidity of 50%.

After a first drying in the mold, followed by stripping, the green part was subjected to further drying and binder removal in air for 3 hours at 650° C.

The blank thus obtained was then sintered in air at 1600° C. for 2 hours. The sintered part, having a density higher than 92% of the theoretical density, was then subjected to hot isostatic pressing (HIP) in argon at 1550° C. for 15 hours and under a pressure of 200 MPa.

The sintered product obtained was then annealed in air at 900° C. for 3 hours in order to reduce the number of oxygen vacancies and to improve its transparency, particularly in the visible and high ultraviolet ranges.

The mean grain size of the product obtained was 0.8 μm.

Table 1 below gives the results of the tests conducted on the products of comparative example 1, example 1, comparative example 2, example 2, and on sapphire (orientation 0°).

TABLE 1

|  | Sapphire (orientation 0°) | Comp. ex. 1 | Ex. 1 | Comp. ex. 2 | Ex. 2 |
|---|---|---|---|---|---|
| Mean grain size (μm) | — | 0.85 | 0.75 | 0.9 | 0.8 |
| Density (% of theoretical density) | — | >99.9 | >99.9 | >99.9 | >99.9 |
| Abnormal grain growth | — | No | No | No | No |
| Mechanical strength at ambient temperature measured by three-point bending (in MPa) |  | 240 | 330 | 320 | 440 |
| Hardness at ambient temperature (in GPa) | 19 | 16.2 | 16.4 | n.d. | n.d. |
| IT(%) at 0.3 μm | 82 | 68.1 | 82.3 | 64.1 | 79.6 |
| IT(%) at 0.6 μm | 83.3 | 81.1 | 84.8 | 76.4 | 82.7 |
| IT(%) at 4 μm | 86.1 | 88 | 88.6 | 84.9 | 85.3 |
| IT(%) at 7 μm | 0 | 0 | 0 | 87 | 87.2 |

"n.d." means "not determined"

It appears that the mechanical strength at ambient temperature measured by bending of the sintered products according to the invention is highly satisfactory, being substantially higher than that of the products of the corresponding comparative examples.

FIG. 1 shows the measurements of in-line transmittance of the products of comparative example 1 and example 1 as a function of the incident radiation wavelength, between 0.2 and 5 μm.

FIG. 1 confirms the outstanding transparency of the product 1 according to the invention, both in the visible wavelengths (0.4 to 0.8 μm) and in the infrared (0.8 to 5 μm) and also in the high ultraviolet (0.2 to 0.4 μm). The values of the in-line transmittance IT of the product 1 according to the invention are also higher than those of sapphire for the wavelengths of 0.6 and 4 μm, as shown in Table 1.

The product of example 2 according to the invention has a higher in-line transmittance IT than that of the product of comparative example 2 for the wavelengths of 0.3, 0.6, 4 and 7 μm. The product of example 2 according to the invention also has an outstanding in-line transmittance IT for the wavelength of 7 μm compared to that of sapphire.

Furthermore, the curves of in-line transmittance IT of the product of example 1 and of the product of comparative example 1 have a specific absorption of the incident radiation for wavelengths between 2.8 and 3.1 μm. This absorption, which is reflected by local collapse (sag) of the curve in FIG. 1, is considered by the inventors as a signature of the fabrication method used. The inventors believe that this occurrence is associated with the presence of residual OH groups.

As it now clearly appears, the invention serves to provide dense products, with fine, hard grains, mechanically strong, particularly in bending, and having very good transparency, particularly in the infrared, visible and even high ultraviolet ranges.

Obviously, the present invention is not limited to the embodiments described, which are provided as illustrative and nonlimiting examples.

The invention claimed is:

1. A sintered product comprising:
   in mass percent based on oxides, more than 99.5% of a material with a cubic structure, having a cubic crystallographic structure for more than 95% of the mass thereof, and having a refractive index of less than 2.75 in the wavelength range between 0.2 μm and 5 μm, and
   more than 50 ppma of dopants, which must contain titanium oxide $TiO_2$ and at least one additional dopant selected from $ZrO_2$, CaO and MgO, in which said at least one additional dopant is different from the oxide(s) forming the material with a cubic structure, but can be MgO when the material which has a cubic structure is spinel $MgAl_2O_4$.

2. The product as claimed in claim 1, in which the material with a cubic structure is selected from spinel $MgAl_2O_4$ zirconia ($ZrO_2$), and YAG ($Y_3Al_5O_{12}$).

3. The product as claimed in claim 2, in which the zirconia ($ZrO_2$) is stabilized in cubic form by yttrium oxide ($Y_2O_3$).

4. The product as claimed in claim 1, in which the material with a cubic structure has a cubic crystallographic structure for more than 99% of its mass.

5. The product as claimed in claim 4, in which the material with a cubic structure has a cubic crystallographic structure for 100% of its mass.

6. The product as claimed in claim 1, comprising more than 100 ppma and less than 500 ppma of dopants.

7. The sintered product as claimed in claim 6, comprising less than 200 ppma of dopants.

8. The sintered product with a cubic structure as claimed in claim 1, in which the $TiO_2$ content is higher than 25 ppma and lower than 300 ppma.

9. The product as claimed in claim 1, in which the mean grain size is higher than 0.03 μm and lower than 5 μm.

10. The product as claimed in claim 9, in which the mean grain size is lower than 2 μm.

11. The product as claimed in claim 10, in which the mean grain size is lower than 1 μm.

12. The product as claimed in claim 11, in which the mean grain size is lower than 0.8 μm.

13. The sintered product as claimed in claim 1, having a density higher than 99.9% of the theoretical density of the mixture of the material with a cubic structure and the dopants.

14. The sintered product as claimed in claim 1, having a density higher than 99.95% of the theoretical density of the mixture of the material with a cubic structure and the dopants.

15. The product as claimed in claim 1, in which the additional dopant is $ZrO_2$, the $TiO_2/ZrO_2$ atomic ratio being between 5/95 and 95/5.

16. The product as claimed in claim 15, in which the zirconia ($ZrO_2$) is stabilized.

17. The product as claimed in claim 1, in which the additional dopant is CaO, the $TiO_2$/CaO atomic ratio being between 37/63 and 63/37.

18. The product as claimed in claim 1, in which the additional dopant is MgO, the $TiO_2$/MgO atomic ratio being between 5/95 and 95/5.

19. The product as claimed in claim 1, having a surface density (Fv) of large grains lower than 4% per unit area.

20. The product as claimed in claim 1, having a surface density (Fv) of large grains lower than 2% per unit area.

21. The product as claimed in claim 1, having a surface density (Fv) of large grains lower than 0.1% per unit area.

22. The product as claimed in claim 1, having an in-line transmittance (IT), measured on a 1.3 mm thick sample:
   higher than 75% of the theoretical in-line transmittance, for an incident radiation wavelength of 0.3 μm, and/or
   higher than 85% of the theoretical in-line transmittance, for an incident radiation wavelength of 0.6 μm, and/or
   higher than 95% of the theoretical in-line transmittance, for an incident radiation wavelength of 4 μm,
   the theoretical in-line transmittance being that of the material with a cubic structure constituting said product in pure and monocrystalline form.

23. The product as claimed in claim 22, having an in-line transmittance (IT), measured on a 1.3 mm thick sample,
   higher than 85% of the theoretical in-line transmittance, for an incident radiation wavelength of 0.3 μm, and/or
   higher than 94% of the theoretical in-line transmittance, for an incident radiation wavelength of 0.6 μm, and/or
   higher than 97% of the theoretical in-line transmittance, for an incident radiation wavelength of 4 μm,
   the theoretical in-line transmittance being that of the material with a cubic structure constituting said product in pure and monocrystalline form.

24. The product as claimed in claim 23, having an in-line transmittance (IT), measured on a 1.3 mm thick sample
   higher than 95% of the theoretical in-line transmittance, for an incident radiation wavelength of 0.3 μm, and/or
   higher than 96% of the theoretical in-line transmittance, for an incident radiation wavelength of 0.6 μm, and/or
   higher than 99% of the theoretical in-line transmittance, for an incident radiation wavelength of 4 μm,
   the theoretical in-line transmittance being that of the material with a cubic structure constituting said product in pure and monocrystal line form.

25. The product as claimed in claim 1, having a mechanical strength at ambient temperature higher than 300 MPa, measured by three point bending.

26. The product as claimed in claim 25, having a mechanical strength at ambient temperature higher than 400 MPa, measured by three point bending.

27. The product as claimed in claim 1, having a Vickers hardness higher than 15 GPa, the hardness being measured according to standard NF A 95-329 with the following specificities: application of a load of 5.3 kilograms for 60 seconds, using a microhardness meter.

28. A method for fabricating a sintered product, wherein an initial charge is prepared comprising a powder of a material with a cubic structure having a refractive index lower than 2.75 in the wavelength range between 0.2 μm and 5 μm and a powder of dopants or dopant precursors necessarily comprising titanium oxide $TiO_2$ or a titanium oxide precursor, and at least one additional dopant selected from $ZrO_2$, CaO, and MgO and the precursors of these additional dopants, in quantities allowing the sintered product to conform to claim 1.

29. The method as claimed in claim 28, comprising a step of shaping by casting a slurry obtained from said initial charge.

30. The fabrication method as claimed in claim 29, comprising the following successive steps:
   a) preparation of a slurry from
      a powder of material with a cubic structure having a median elementary particle size of between 0.02 and 0.5 μm, and
      a powder of dopants necessarily comprising titanium oxide $TiO_2$ or a titanium oxide precursor on the one hand, and at least one additional dopant selected from $ZrO_2$, CaO, MgO and/or a precursor of these oxides on the other hand, the median elementary particle size of the dopant being lower than or equal to the median elementary particle size of the powder of material with a cubic structure,
   b) casting of the slurry in a porous mold followed by drying and stripping in order to obtain a green part,
   c) drying of the stripped green part,
   d) binder removal at a temperature between 350 and 1000° C.,
   e) sintering at a temperature between 1280° C. and 1800° C. until a sintered product is obtained having a density at least equal to 92% of the theoretical density of the product obtained at the end of step f), and
   f) hot isostatic pressing (HIP) at a temperature between 1180° C. and 1780° C. under a pressure equal to or higher than 5 MPa,
   the contents of material with a cubic structure and of dopants/dopant precursor(s) in the slurry prepared in step a) being determined so that the sintered product obtained at the end of step f) comprises:
   in mass percent based on oxides, more than 99.5% of a material known as a material with a cubic structure, having a cubic crystallographic structure for more than 95% of the mass thereof, and having a refractive index of less than 2.75 in the wavelength range between 0.2 μm and 5 μm, and
   more than 50 ppma of dopants, which must contain titanium oxide $TiO_2$ and at least one additional dopant selected from $ZrO_2$, CaO and MgO, in which said at least one additional dopant is different from the oxide(s) forming the material with a cubic structure, but can be MgO when the material which has a cubic structure is spinel $MgAl_2O_4$.

31. The fabrication method as claimed in claim 30, comprising a step g) of annealing at a temperature between 900° C. and the temperature used in step f) and for a period of between 0.5 and 24 hours in order to reduce the number of oxygen vacancies of the product.

32. The fabrication method according to claim 30, the hot isostatic pressing being carried out at a temperature 20 to 100° C. lower than the sintering temperature.

33. The fabrication method as claimed in claim 30, the elementary particles forming aggregates having a median size between 0.1 and 3 μm.

34. The fabrication method as claimed in claim 30, in which the binder removal is carried out at a temperature equal to or lower than 800° C. and the hot isostatic pressing is carried out at a pressure equal to or lower than 300 MPa.

35. The fabrication method as claimed in claim 30, in which the hot isostatic pressing is carried out at a pressure equal to or higher than 50 MPa.

36. A method of fabricating or producing a temperature viewing window, missile dome, or transparent armor with the sintered product as claimed in claim 1.

37. The product as claimed in claim 15, wherein the $TiO_2/ZrO_2$ ratio is between 40/60 and 60/40.

38. The product as claimed in claim 17, wherein the $TiO_2/CaO$ atomic ratio is between 45/55 and 55/45.

39. The product as claimed in claim 18, wherein the $TiO_2/MgO$ atomic ratio is between 40/60 and 60/40.

* * * * *